(12) United States Patent
Takahashi (10) Patent No.: US 10,260,888 B2
(45) Date of Patent: Apr. 16, 2019

(54) NAVIGATION SATELLITE SYSTEM, ELECTRONIC DEVICE, AND POSITIONING METHOD

(71) Applicant: Panasonic Intellectual Property Management Co., Ltd., Osaka (JP)

(72) Inventor: Katsunao Takahashi, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 0 days.

(21) Appl. No.: 15/701,479

(22) Filed: Sep. 12, 2017

(65) Prior Publication Data
US 2018/0023958 A1  Jan. 25, 2018

Related U.S. Application Data

(63) Continuation of application No. PCT/JP2016/000969, filed on Feb. 24, 2016.

(30) Foreign Application Priority Data

Mar. 13, 2015 (JP) ................................. 2015-051152

(51) Int. Cl.
*G01C 21/28* (2006.01)
*G01S 19/43* (2010.01)
(Continued)

(52) U.S. Cl.
CPC ............. *G01C 21/28* (2013.01); *G01S 19/04* (2013.01); *G01S 19/43* (2013.01); *G01S 19/44* (2013.01); *G01S 19/51* (2013.01)

(58) Field of Classification Search
CPC ................................ G01C 21/28; G01S 19/43
See application file for complete search history.

(56) References Cited

U.S. PATENT DOCUMENTS

| 5,914,685 A * | 6/1999 | Kozlov | ................... | G01S 19/44 |
|---|---|---|---|---|
| | | | | 342/357.26 |
| 2006/0017611 A1* | 1/2006 | Hatch | ................... | G01S 5/0045 |
| | | | | 342/357.31 |

(Continued)

FOREIGN PATENT DOCUMENTS

| JP | 11-101864 A | 4/1999 |
|---|---|---|
| JP | 2007-024789 A | 2/2007 |

(Continued)

OTHER PUBLICATIONS

International Search Report for corresponding International Application No. PCT/JP2016/00969 dated May 17, 2016.

*Primary Examiner* — Jess Whittington
(74) *Attorney, Agent, or Firm* — Renner, Otto, Boisselle & Sklar, LLP (57) ABSTRACT

A navigation satellite system includes a first electronic device that decides, based on received GNSS correction data, integer ambiguity in a difference between a first carrier phase of a first radio wave received by a fixed station and a second carrier phase of a second radio wave received by the first electronic device to calculate a path difference between the first radio wave and the second radio wave. The system also includes a second electronic device that calculates, based on the GNSS correction data, a difference between a third carrier phase of a third radio wave received by the second electronic device and the first carrier phase received from the first electronic device and calculates, by using the integer ambiguity, a path difference between the first radio wave and the third radio wave to calculate second relative coordinates of the second electronic device with respect to the fixed station.

8 Claims, 9 Drawing Sheets

(51) Int. Cl.
    *G01S 19/51*    (2010.01)
    *G01S 19/04*    (2010.01)
    *G01S 19/44*    (2010.01)

(56) References Cited

U.S. PATENT DOCUMENTS

| | | | |
|---|---|---|---|
| 2007/0225016 A1* | 9/2007 | Jendbro | G01S 19/05 455/456.1 |
| 2011/0037647 A1* | 2/2011 | Tajima | G01S 5/0072 342/357.26 |
| 2017/0307760 A1* | 10/2017 | Chen | G01S 19/04 |

FOREIGN PATENT DOCUMENTS

| | | |
|---|---|---|
| JP | 2009-264844 A | 11/2009 |
| JP | 2014-153193 A | 8/2014 |

* cited by examiner

NAVIGATION SATELLITE SYSTEM, ELECTRONIC DEVICE, AND POSITIONING METHOD

BACKGROUND

1. Technical Field

The present disclosure relates to a navigation satellite system, an electronic device, and a positioning method that receive radio waves from a global navigation satellite system (GNSS) satellite such as a global positioning system (GPS) satellite and calculate position coordinates.

2. Description of Related Art

A GPS is a navigation satellite method for detecting a three-dimensional position on the earth based on positions of twenty-four satellites that rotate above the earth. One example of the GPS is a kinematic positioning method. The kinematic positioning method is a method for calculating an error based on a carrier wave received by a fixed station whose position coordinates have been known (an electronic reference point), and transmitting the calculated error to a mobile station (an electronic device) to improve accuracy of positioning in the mobile station. A developed positioning method of the kinematic positioning method is a real time kinematic positioning method for navigating a mobile station in real time (hereinafter, referred to as an RTK positioning method).

Unexamined Japanese Patent Publication No. 11-101864 (1999) discloses a positioning device using the RTK positioning method. In this positioning device, an initial value of a phase difference is obtained without executing an initializing process for obtaining an integer bias that is called on-the-fly calibration (OTF).

SUMMARY

The present disclosure provides a navigation satellite system, an electronic device, and a positioning method that can shorten a positioning time.

The navigation satellite system of the present disclosure includes first and second electronic devices that calculate position coordinates of the first and second electronic devices by using a radio wave from a GNSS satellite, respectively. The first electronic device includes a first receiver, a first calculator, and a transmitter. The first receiver receives GNSS correction data from a fixed station installed at a known point. The first calculator decides, based on the received GNSS correction data, integer ambiguity in a difference between a first carrier phase of a first radio wave received by the fixed station and a second carrier phase of a second radio wave received by the first electronic device, and calculates a path difference between the first radio wave and the second radio wave to calculate first relative coordinates of the first electronic device with respect to the fixed station. The transmitter transmits the integer ambiguity to the second electronic device. The second electronic device includes a second receiver and a second calculator. The second receiver receives the integer ambiguity from first electronic device 2. The second calculator calculates, based on the GNSS correction data, a difference between a third carrier phase of a third radio wave received by the second electronic device and the first carrier phase and calculates, using the integer ambiguity, a path difference between the first radio wave and the third radio wave to calculate second relative coordinates of the second electronic device with respect to the fixed station.

In a positioning method for a navigation satellite system of the present disclosure, the navigation satellite system includes first and second electronic devices that calculate position coordinates of the first and second electronic devices by using a radio wave from a GNSS satellite, respectively. A positioning method includes a step of causing a first electronic device to receive GNSS correction data from a fixed station installed at a known point. The positioning method further includes a step of causing the first electronic device to decide, based on the received GNSS correction data, integer ambiguity in a difference between a first carrier phase of a first radio wave received by the fixed station and a second carrier phase of a second radio wave received by the first electronic device and calculate a path difference between the first radio wave and the second radio wave to calculate first relative coordinates of the first electronic device with respect to the fixed station. The positioning method further includes a step of causing the first electronic device to transmit the integer ambiguity to the second electronic device. The positioning method further includes a step of causing the second electronic device to receive the integer ambiguity from the first electronic device. The positioning method further includes a step of causing the second electronic device to calculate, based on the GNSS correction data, a difference between a third carrier phase of a third radio wave received by the second electronic device and the first carrier phase and calculate, using the integer ambiguity, a path difference between the first radio wave and the third radio wave to calculate second relative coordinates of the second electronic device with respect to the fixed station.

A first electronic device of the present disclosure calculates position coordinates of the first electronic device by using a radio wave from a GNSS satellite. The first electronic device includes a receiver and a first calculator, and a transmitter. The receiver receives GNSS correction data from a fixed station installed at a known point. The first calculator decides, based on the received GNSS correction data, integer ambiguity in a difference between a first carrier phase of a first radio wave received by the fixed station and a second carrier phase of a second radio wave received by the first electronic device, and calculates a path difference between the first radio wave and the second radio wave to calculate first relative coordinates of the first electronic device with respect to the fixed station. The transmitter transmits the integer ambiguity to the second electronic device that calculates position coordinates of the second electronic device by using a radio wave from a GNSS satellite.

The second electronic device of the present disclosure calculates position coordinates of the second electronic device by using the radio wave from the GNSS satellite. The second electronic device includes a receiver and a second calculator. The receiver receives, from a first electronic device that calculates position coordinates of the first electronic device by using the radio wave from the GNSS satellite, integer ambiguity, which is decided based on GNSS correction data in the first electronic device, in a difference between a first carrier phase of a first radio wave received by a fixed station and a second carrier phase of a second radio wave received by the second electronic device. The second calculator calculates, based on the GNSS correction data, a difference between a third carrier phase of a third radio wave received by the second electronic device and the first carrier phase using the received integer ambiguity and calculates a path difference between the first radio wave and the third radio wave to calculate second relative coordinates of the second electronic device with respect to the fixed station.

DETAILED DESCRIPTION

Exemplary embodiments will be described below in detail with reference to the drawings appropriately. However, detailed descriptions more than necessary might be sometimes omitted. For example, there is a case where detailed description of already well-known items and repeated description with respect to substantially the same configuration are omitted. These omissions are made to avoid unnecessary redundancy of the following description, and to make those skilled in the art easily understand the present disclosure.

Note that the inventor of the present disclosure provides the accompanying drawings and the following description in order to allow those skilled in the art to fully understand the present disclosure, and does not intend to limit the subject matter as described in the appended claims.

In the following exemplary embodiments, as an example of a global navigation satellite system (GNSS), a global positioning system (GPS) will be described. Examples of the GNSS include GLONASS, BeiDou, and Gallileo besides the GPS. A technique of the present disclosure can be applied also to these GNSSs.

(Specific Problem to be Assumed by the Present Disclosure)

Figure 8:
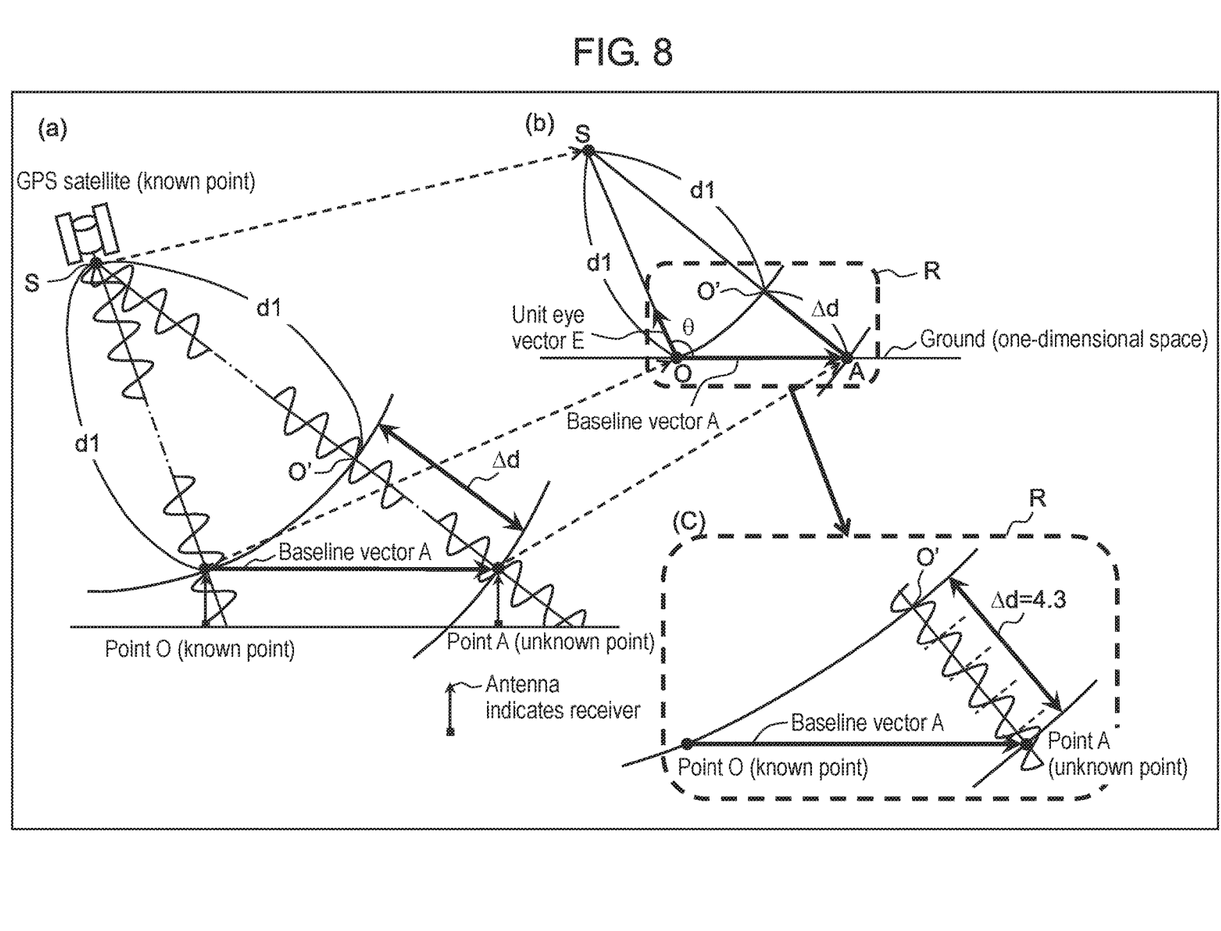
FIG. 8 is a schematic diagram for describing a principle of an RTK positioning method.

In a real time kinematic (RTK) positioning method, position coordinates are obtained by using a difference between wave numbers (numbers of waves) of carrier waves (radio waves) transmitted from the GPS satellite to the earth. FIG. 8 is a schematic diagram for describing a principle of an RTK positioning method. Part (a) of FIG. 8 describes the RTK positioning method in which an entire space is assumed to be a two-dimensional space (a plane) and the ground is assumed to be a one-dimensional space (a straight line). The RTK positioning method first obtains path difference $\Delta d$ between distance d1 from point O as a known point (a point whose position has been found) to position S of the GPS satellite as a known point, and distance (d1+$\Delta d$) from point A as an unknown point (an unclear position) to position S of the GPS satellite as the known point. Next, baseline vector A in which point O is a start point and point A is an end point is obtained based on path difference $\Delta d$, and position coordinates of point A as the unknown point (relative coordinates of point A with respect to point O) are calculated. Part (b) of FIG. 8 illustrates a geometric relationship of part (a) of FIG. 8, and part (c) of FIG. 8 illustrates enlarged region R in part (b) of FIG. 8. In part (b) of FIG. 8, E represents a unit eye vector from point O to point S, and $\theta$ represents an angle formed by unit eye vector E and baseline vector A. In part (c) of FIG. 8, a wave number of path difference $\Delta d$ is 4.3 in which 4 represents integer ambiguity (described later) and 3 is a decimal part.

In the above RTK positioning method, a lot of points in which each phase is the same as a phase of a true solution at a predetermined time are present (namely, multiple solutions are found). As illustrated in FIG. 8, path difference $\Delta d$ (a difference) of a wave number of carrier waves includes uncertain elements corresponding to an integer multiple of a wavelength of the carrier waves (integer ambiguity). It is necessary for obtaining path difference $\Delta d$ (the difference) to first decide a true solution (integer ambiguity) from multiple solutions (normally about one hundred thousand sets). A process for deciding the integer ambiguity is called an "initializing process". A state that the integer ambiguity is decided and positioning is completed is called a "fixed state". Since the initializing process needs a lot of amount of calculation, it takes a considerable time (about 2 to 3 minutes) to complete the entire calculation.

Further, in the above-mentioned RTK positioning method, in order to obtain position coordinates of an unknown point, GPS correction data is received from a fixed station having known position coordinates, and the position coordinates are obtained based on the received GPS correction data. A time period during which the GPS correction data is received from the fixed station is about one minute. The GPS correction data is used for calculating an error obtained by performing subtraction between position coordinates obtained by receiving a radio wave from the GPS satellite and accurate position coordinates at a point having clear position coordinates (a fixed station or a base station). The use of the GPS correction data makes it possible to improve positioning accuracy.

As described above, a time for the initializing process (about 2 to 3 minutes) and a time for receiving GPS correction data (about 1 minute) are minimally required to calculate position coordinates through the RTK positioning method. Thus, a time for entire positioning becomes long.

Taking note of the above-described problem, in a first exemplary embodiment, in the RTK positioning method for the electronic device, the time for the initializing process and the time for receiving GPS correction data are shortened by using integer ambiguity decided in the electronic device in a fixed state and GPS correction data received by the electronic device in the fixed state. A navigation satellite system in which the time for the entire positioning can be shortened is provided. The first exemplary embodiment will be described below with reference to FIGS. 1 to 5.

First Exemplary Embodiment

1. Configuration

Figure 1:
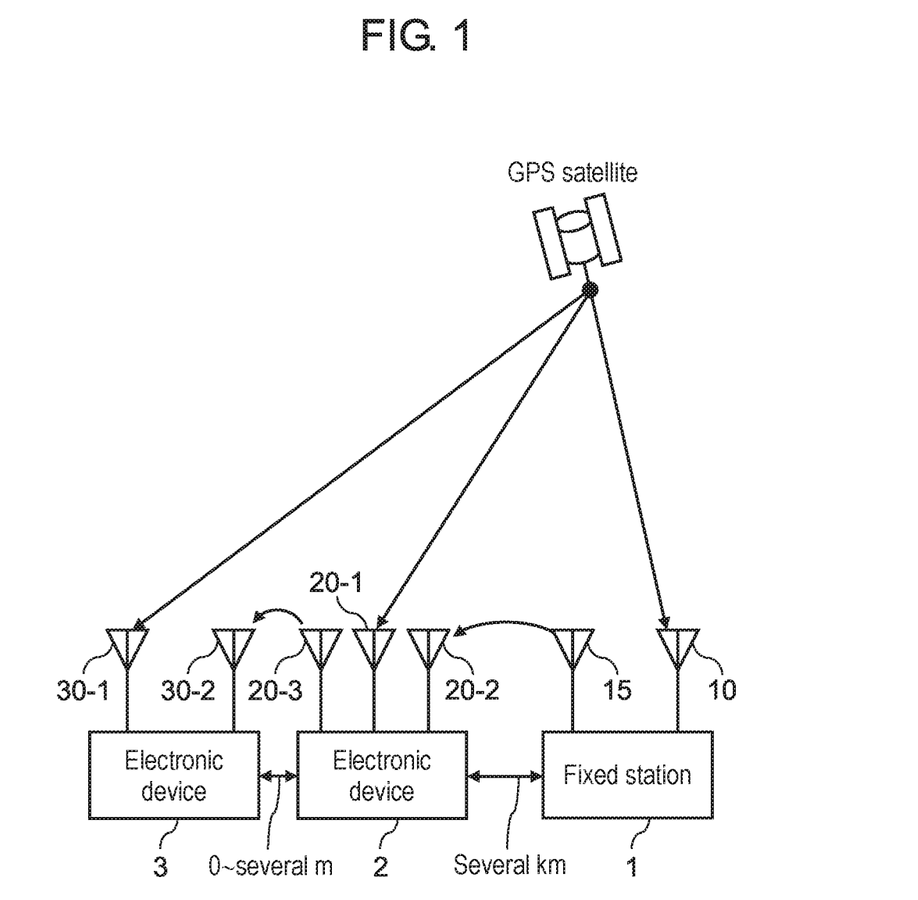
FIG. 1 is a schematic diagram illustrating a navigation satellite system according to a first exemplary embodiment of the present disclosure.

FIG. 1 is a schematic diagram illustrating a navigation satellite system according to a first exemplary embodiment of the present disclosure. A navigation satellite system in FIG. 1 includes fixed station 1, first electronic device (mobile station) 2, and second electronic device (mobile station) 3. First and second electronic devices 2, 3 are, for example, personal computers. Fixed station 1 is installed at an electronic reference point having known coordinates, and first electronic device 2 and second electronic device 3 move away from fixed station 1 by about several kilometers.

Fixed station 1, and first and second electronic devices 2, 3 receive radio waves from the GPS satellite as carrier waves via GPS receiving antennas 10, 20-1, 30-1, respectively. First electronic device 2 and second electronic device 3 each calculate a path difference between a carrier wave observed in each of the electronic devices and a carrier wave received by fixed station 1, and obtain a baseline vector whose start point is fixed station 1 to obtain position coordinates of each of the electronic devices. First electronic device 2 receives GPS correction data from fixed station 1 via radio transmitting antenna 15 and radio receiving antenna 20-2, and performs RTK positioning based on the received GPS correction data to calculate the position coordinates of first electronic device 2. Further, second electronic device 3 receives integer ambiguity and the GPS correction data from first electronic device 2 via radio transmitting antenna 20-3 and radio receiving antenna 30-2, and performs RTK positioning based on the received integer ambiguity and GPS correction data and the carrier wave observed in second electronic device 3 to calculate the position coordinates of second electronic device 3. Details of the above process will be described below.

Figure 2:
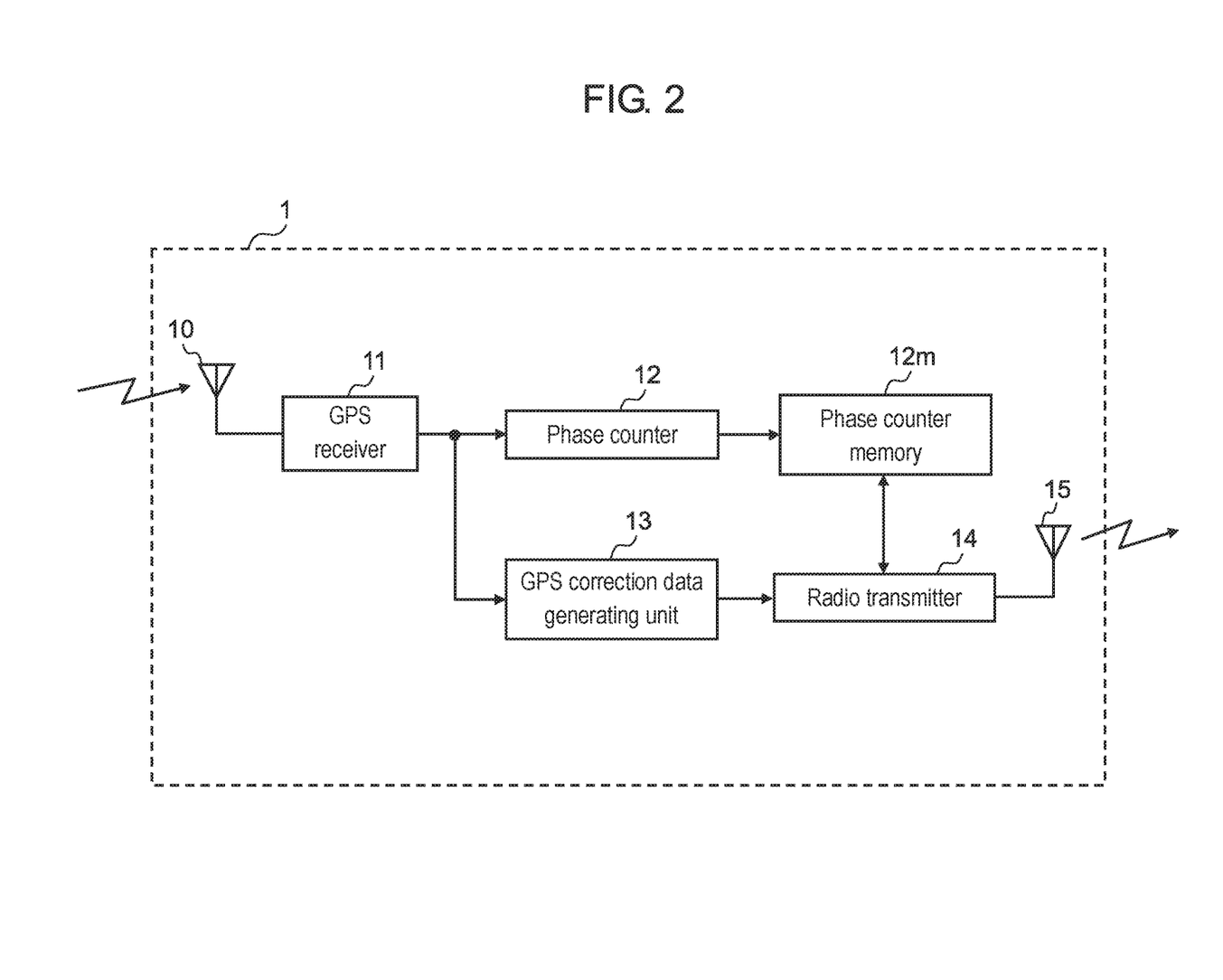
FIG. 2 is a block diagram illustrating constituent elements of a fixed station in FIG. 1.

FIG. 2 is a block diagram illustrating constituent elements of fixed station 1 in FIG. 1. Fixed station 1 in FIG. 2 includes GPS receiving antenna 10, GPS receiver 11, phase counter 12, phase counter memory 12$m$, GPS correction data generating unit 13, radio transmitter 14, and radio transmitting antenna 15.

GPS receiver 11 receives a satellite signal as a first carrier wave from the GPS satellite via GPS receiving antenna 10, and outputs received first carrier wave data to phase counter 12 and GPS correction data generating unit 13.

Phase counter 12 counts a wave number of the first carrier waves based on the first carrier wave data, and calculates and outputs a first carrier phase to radio transmitter 14. Phase counter 12 counts the wave number of the carrier wave (the radio wave) transmitted from the GPS satellite, and reads a count value (a carrier phase) when a clock of fixed station 1 indicates a predetermined time to store the count value in phase counter memory 12$m$.

GPS correction data generating unit 13 generates GPS correction data for calculating position coordinates of first and second mobile stations by using the RTK positioning method and outputs the GPS correction data to radio transmitter 14.

Radio transmitter 14 transmits the GPS correction data to radio receiving antenna 20-2 (described later) of first electronic device 2 via radio transmitting antenna 15.

Figure 3:
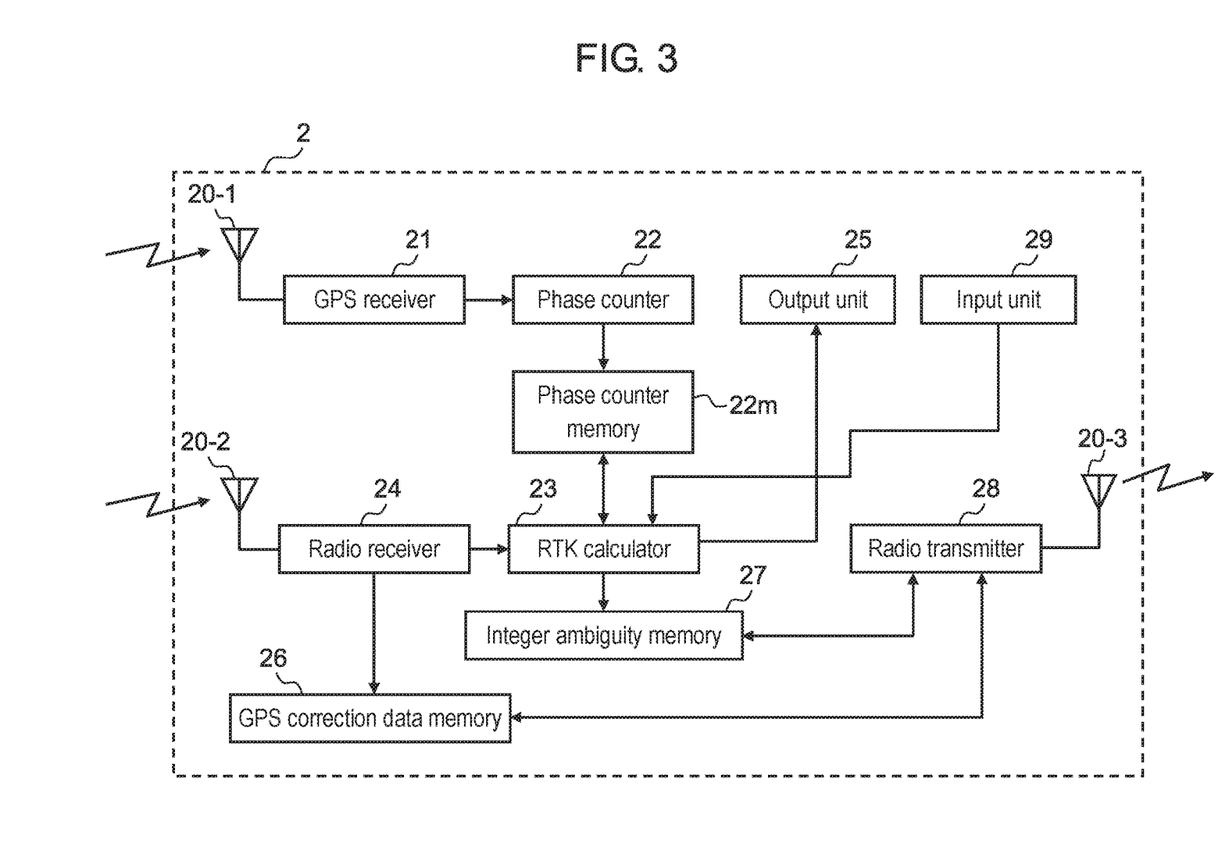
FIG. 3 is a block diagram illustrating constituent elements of a first electronic device in FIG. 1.

FIG. 3 is a block diagram illustrating constituent elements of first electronic device 2. First electronic device 2 includes GPS receiving antenna 20-1, radio receiving antenna 20-2, GPS receiver 21, phase counter 22, phase counter memory 22$m$, RTK calculator 23, radio receiver 24, output unit 25, GPS correction data memory 26, integer ambiguity memory 27, radio transmitter 28, input unit 29, and radio transmitting antenna 20-3. RTK calculator 23 performs calculation by using the RTK positioning method. Output unit 25 is an output unit such as a liquid crystal display. Input unit 29 is an input user interface (UI) such as a keyboard or a mouse. When positioning of first electronic device 2 is started, a user operates first electronic device 2 via input unit 29.

GPS receiver 21 receives a satellite signal as a second carrier wave from the GPS satellite via GPS receiving antenna 20-1, and outputs received second carrier wave data to phase counter 22.

Phase counter 22 counts a wave number of the second carrier waves based on the second carrier wave data, and calculates a second carrier phase to store the second carrier phase in phase counter memory 22$m$. Phase counter 22 counts a wave number of a carrier wave (a radio wave) transmitted from the GPS satellite and reads a count value when a clock of first electronic device 2 indicates a predetermined time to store the count value in phase counter memory 22$m$.

Radio receiver 24 receives GPS correction data via radio receiving antenna 20-2. Radio receiver 24 stores the GPS correction data in GPS correction data memory 26, and outputs a first carrier phase to RTK calculator 23.

When the user performs an operation for starting positioning, input unit 29 generates a positioning start instructing signal to output the positioning start instructing signal to RTK calculator 23.

RTK calculator 23 decides integer ambiguity in a path difference that is a difference between the first carrier phase and the second carrier phase based on the input positioning start instructing signal and completes the initializing process to calculate the path difference based on the decided integer ambiguity. That is, RTK calculator 23 calculates the path difference based on a difference between count values read at the same time.

Further, RTK calculator 23 obtains a baseline vector whose start point is fixed station 1 and whose end point is first electronic device 2 based on the calculated path difference, and calculates position coordinates of first electronic device 2 (relative coordinates of first electronic device 2 with respect to fixed station 1) to output the position coordinates to output unit 25. Output unit 25 displays the calculated position coordinates of the first electronic device 2. First electronic device 2 at this time is in a fixed state. Further, RTK calculator 23 stores the integer ambiguity of the path difference in integer ambiguity memory 27.

Radio transmitter 28 transmits the GPS correction data stored in GPS correction data memory 26 and the integer ambiguity stored in integer ambiguity memory 27 to second electronic device 3 via radio transmitting antenna 20-3.

Figure 4:
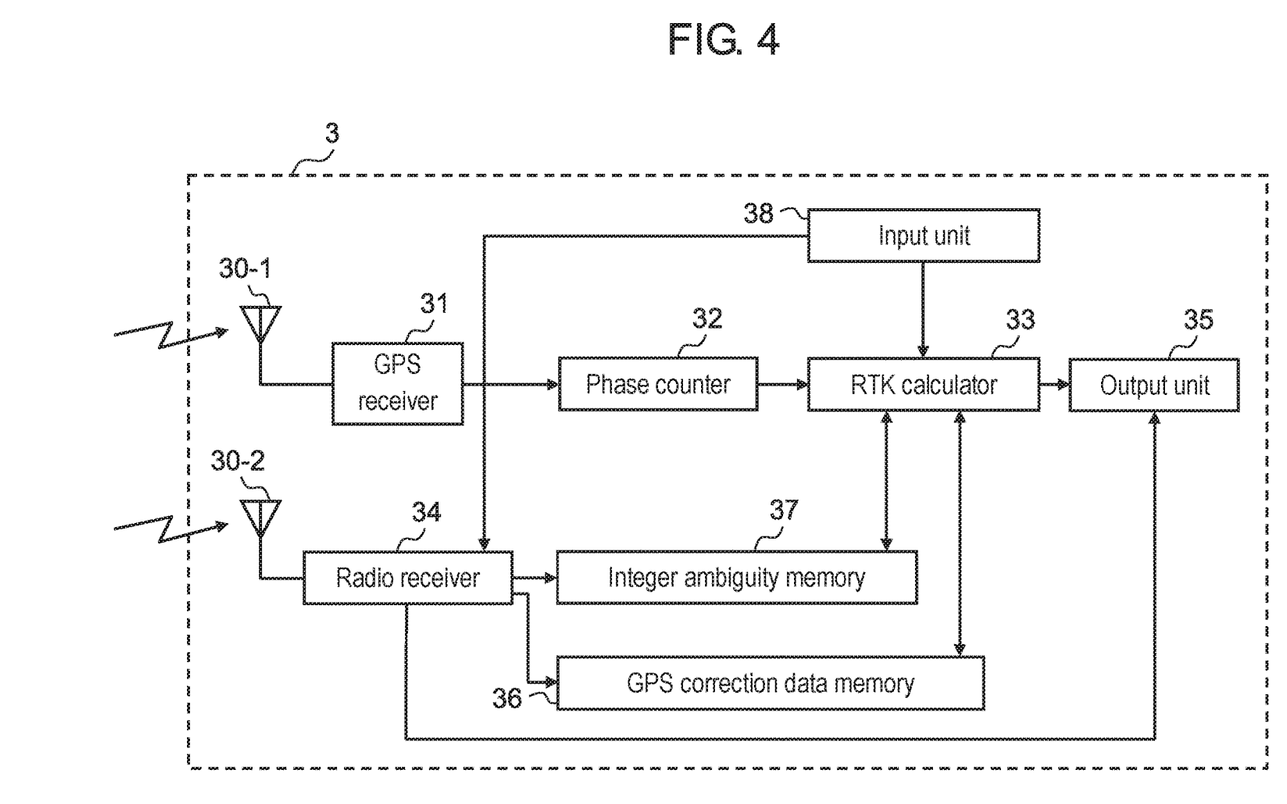
FIG. 4 is a block diagram illustrating a second electronic device in FIG. 1.

FIG. 4 is a block diagram illustrating constituent elements of second electronic device 3. Second electronic device 3 includes GPS receiving antenna 30-1, radio receiving antenna 30-2, GPS receiver 31, phase counter 32, RTK calculator 33, radio receiver 34, output unit 35, GPS correction data memory 36, integer ambiguity memory 37, and input unit 38. RTK calculator 33 performs calculation using the RTK positioning method. Output unit 35 is a display unit such as a liquid crystal display. Input unit 38 is a user interface (UI) such as a keyboard or a mouse. When second electronic device 3 receives the integer ambiguity and the GPS correction data from first electronic device 2 in a fixed state, and when positioning of second electronic device 3 is started, a user operates second electronic device 3 via input unit 29. Hereinafter, an operation to be performed by the user to receive the integer ambiguity and the GPS correction data from first electronic device 2 is called a "reception start operation", and an operation to be performed by the user to start the positioning of second electronic device 3 is called "positioning start operation".

GPS receiver 31 receives a satellite signal as a third carrier wave from the GPS satellite via GPS receiving antenna 30-1, and outputs received third carrier wave data to phase counter 32.

Phase counter 32 counts a wave number of the third carrier waves based on the third carrier wave data, and calculates a third carrier phase to output the third carrier phase to RTK calculator 33. Phase counter 32 counts a wave number of a carrier wave (a radio wave) transmitted from the GPS satellite, and reads a count value when a clock of second electronic device 3 indicates a predetermined time. Phase counter 32 once stores the count value in a memory (not shown) to output the count value to RTK calculator 33 afterward.

When the user performs the reception start operation, input unit 38 generates a reception start signal and outputs the reception start signal to radio receiver 34.

Radio receiver 34 receives the GPS correction data and the integer ambiguity via radio receiving antenna 30-2 based on the input reception start signal. Radio receiver 34 stores the GPS correction data in GPS correction data memory 36, and stores the integer ambiguity in integer ambiguity memory 37. Radio receiver 34 outputs the stored integer ambiguity and GPS correction data to output unit 35. Output unit 35 displays the integer ambiguity and the GPS correction data. When the integer ambiguity is stored in integer ambiguity memory 37, the initializing process is completed.

When the user performs the positioning start operation, input unit 38 generates a positioning start instructing signal and outputs the positioning start instructing signal to RTK calculator 33.

When receiving the generated positioning start instructing signal, RTK calculator 33 calculates a path difference that is a difference between the first carrier phase and the third carrier phase, based on the GPS correction data and the integer ambiguity. As a result, RTK calculator 33 obtains a baseline vector in which fixed station 1 is a start point and second electronic device 3 is an end point, and calculates position coordinates of second electronic device 3 (relative coordinates of second electronic device 3 with respect to fixed station 1) to output the position coordinates to output unit 35.

Output unit 35 displays the calculated position coordinates of second electronic device 3. Second electronic device 3 at this time is in a fixed state.

2. Operation

An operation of the navigation satellite system having the above configuration will be described below. Second electronic device 3 terminates communication with fixed station 1, and receives the integer ambiguity decided in the RTK positioning method from first electronic device 2 whose position coordinates have been already defined by the RTK positioning method, and defines the position coordinates of second electronic device 3 by using the integer ambiguity in accordance with RTK positioning method.

Specifically, fixed station 1 generates GPS correction data to be used in the RTK positioning method. First electronic device 2 performs the RTK positioning method by using the GPS correction data, and decides integer ambiguity in the path difference to define position coordinates of first electronic device 2. Thereafter, second electronic device 3 receives the GPS correction data and the integer ambiguity from first electronic device 2, and calculates the position coordinates of second electronic device 3 by using these data in accordance with the RTK positioning method. Due to such control, since a procedure of the initializing process is omitted in second electronic device 3, a processing time for entire positioning can be shortened. This operation will be described in detail below.

Figure 5A:
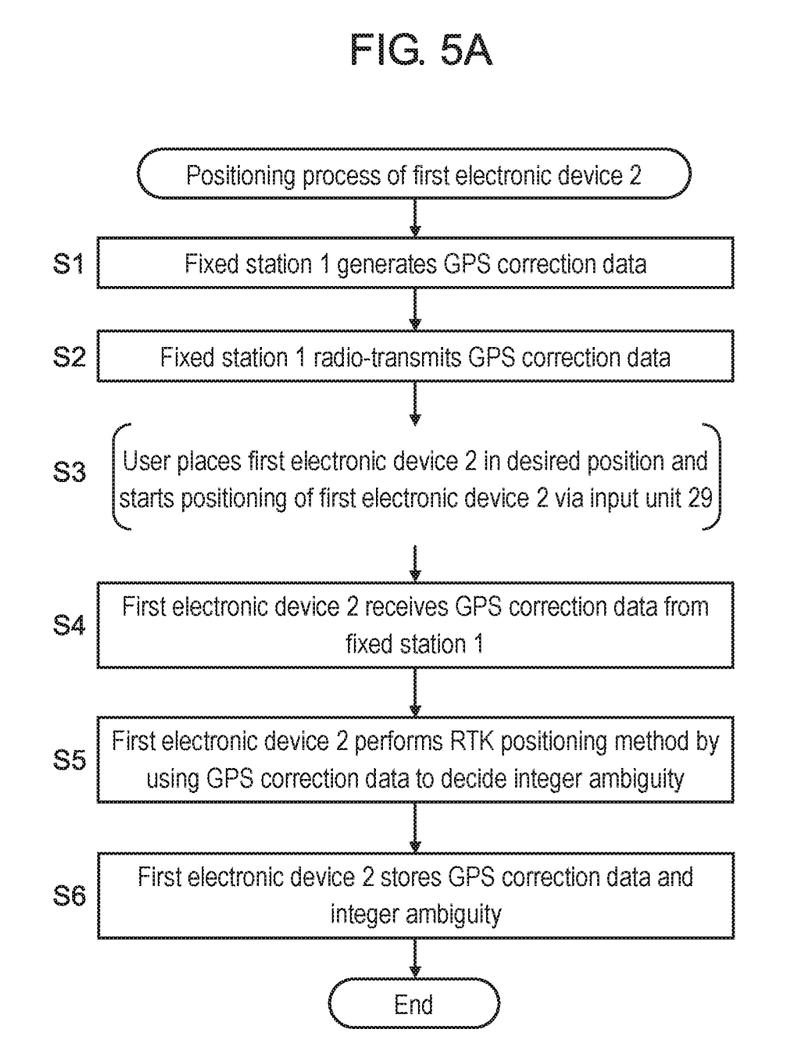
FIG. 5A is a flowchart illustrating a positioning process executed by the first electronic device in FIG. 1.

FIG. 5A is a flowchart of a positioning process executed by first electronic device 2 according to the first exemplary embodiment.

In FIG. 5A, fixed station 1 first receives a satellite signal from the GPS satellite, and generates the GPS correction data (step S1), and radio-transmits the GPS correction data to an outside via radio transmitting antenna 15 (step S2).

The user places first electronic device 2 in a desired position and starts positioning of first electronic device 2 via input unit 29 (step S3). As a result, first electronic device 2 receives the GPS correction data from fixed station 1 (step S4).

First electronic device 2 decides integer ambiguity by using the received GPS correction data in accordance with the RTK positioning method (step S5), and stores the GPS correction data and the integer ambiguity in memories (26, 27), respectively (step S6), to terminate this process. At this time, the position coordinates of first electronic device 2 are displayed on output unit 25, and the user can determine that the positioning of first electronic device 2 is completed.

Figure 5B:
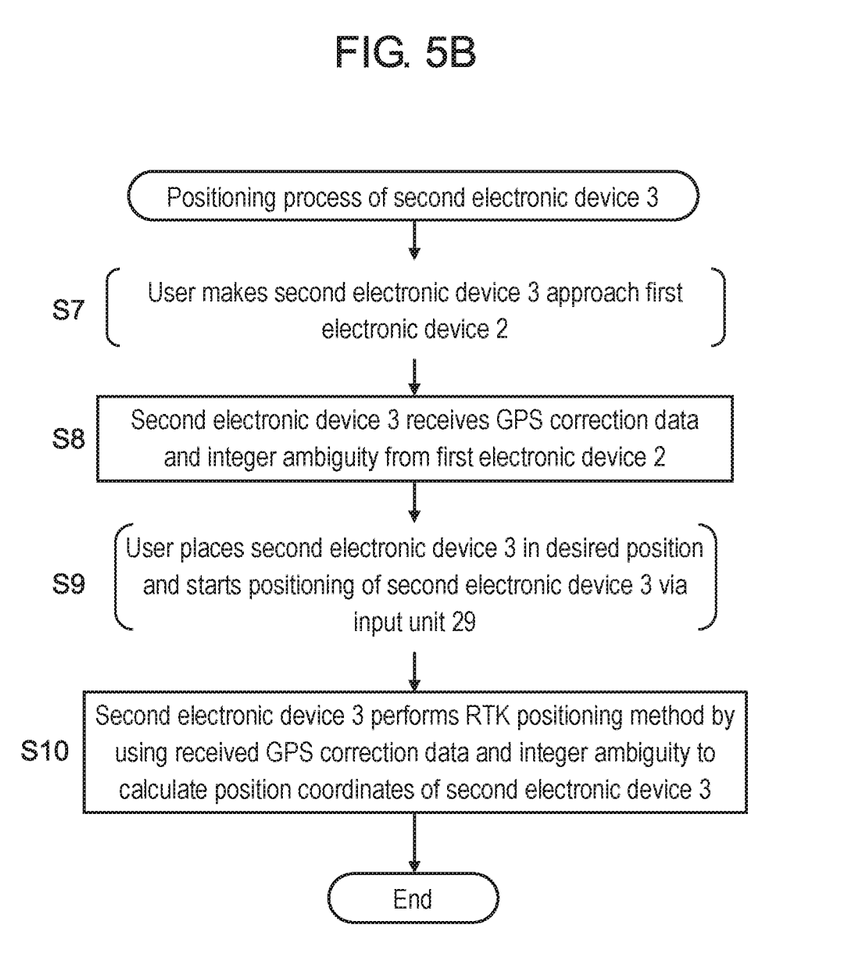
FIG. 5B is a flowchart illustrating a positioning process to be executed by the second electronic device in FIG. 1.

Next, the positioning process of second electronic device 3 will be described below. Here, it is assumed that first electronic device 2 completes the positioning process illustrated in FIG. 5A, and is in the fixed state. FIG. 5B is a flowchart illustrating a positioning process to be executed by second electronic device 3 according to the first exemplary embodiment.

As illustrated in FIG. 5B, the user makes second electronic device 3 approach first electronic device 2 so that a distance therebetween becomes within 0 meter to several meters (step S7). As a result, second electronic device 3 is brought into a state of being capable of receiving the GPS correction data and the integer ambiguity from first electronic device 2 via input unit 38 (a radio connected state). The position coordinates of second electronic device 3 is approximately identical to the position coordinates of first electronic device 2. Therefore, in RTK positioning method in second electronic device 3, a path difference in second electronic device 3 is approximately identical to the path difference in first electronic device 2 in the fixed state. Therefore, since integer ambiguity in the path difference in second electronic device 3 is identical to the integer ambiguity decided in first electronic device 2, second electronic device 3 can use the integer ambiguity decided in first electronic device 2 as integer ambiguity in the path difference of second electronic device 3.

Second electronic device 3 receives the GPS correction data and the integer ambiguity from first electronic device 2 in the fixed state via radio receiving antenna 30-2 (step S8). The received GPS correction data and integer ambiguity are displayed on a display unit (output unit 35) of second electronic device 3. As a result, the user can determine that the initializing process of second electronic device 3 is completed.

The user moves and places second electronic device 3 in a desired position and starts the positioning of second electronic device 3 via input unit 29 (step S9). As a result, second electronic device 3 performs the RTK positioning method by using the GPS correction data and the integer ambiguity received from first electronic device 2, and calculates the position coordinates of second electronic device 3 (step S10) to terminate this process. Further, since the position coordinates of second electronic device 3 are displayed on output unit 25 of second electronic device 3, the user can determine that the positioning is completed. Since second electronic device 3 uses the integer ambiguity received from first electronic device 2, the reception of the GPS correction data from fixed station 1 and the decision of integer ambiguity in second electronic device 3 are not necessary. For this reason, the processing time for the initializing process in the positioning process can be shortened.

3. Effects and Others

As described above, the navigation satellite system according to the first exemplary embodiment includes first and second electronic devices 2, 3 that calculate position coordinates of themselves by using radio waves from the GPS satellite, respectively. First electronic device 2 includes radio receiver 24, RTK calculator 23, and radio transmitter 14. Radio receiver 24 receives GPS correction data from a fixed station installed at a known point. RTK calculator 23 decides, based on the received GPS correction data, integer ambiguity in a difference between a first carrier phase of a first radio wave received by the fixed station and a second carrier phase of a second radio wave received by first electronic device 2, and calculates a path difference between the first radio wave and the second radio wave to calculate first relative coordinates of the first electronic device 2 with respect to fixed station 1. Radio transmitter 14 transmits the integer ambiguity to second electronic device 3. Second electronic device 3 includes radio receiver 34 and RTK calculator 33. Radio receiver 34 receives the integer ambiguity from first electronic device 2. RTK calculator 33 calculates, based on the GPS correction data, a difference between a third carrier phase of a third radio wave received by second electronic device 3 and the first carrier phase, and calculates, by using the integer ambiguity, a path difference between the first radio wave and the third radio wave to calculate second relative coordinates of second electronic device 3 with respect to fixed station 1.

This configuration makes it possible to transmit integer ambiguity in the difference between the first carrier phase and the second carrier phase calculated by RTK calculator 23 of first electronic device 2 to second electronic device 3 via radio transmitter 28. Therefore, since the integer ambiguity decided by first electronic device 2 in the fixed state is used in the RTK positioning method in second electronic device 3, the path difference can be calculated without deciding the integer ambiguity in the difference between the first carrier phase and the third carrier phase. Therefore, since the initializing process is not necessary in the RTK positioning method in second electronic device 3, the time required for positioning can be shortened.

Further, in the navigation satellite system according to the first exemplary embodiment, radio transmitter 14 of first electronic device 2 transmits the GPS correction data from fixed station 1 to second electronic device 3, and radio receiver 34 of second electronic device 3 receives the GPS correction data from first electronic device 2.

With this configuration, second electronic device 3 is made to approach first electronic device 2, and to receive the GPS correction data stored in first electronic device 2 via radio receiving antenna 30-2. Therefore, since the reception time for receiving the GPS correction data necessary in the RTK positioning method (about 1 minute) can be eliminated, the positioning time can be shortened. Further, also when radio connection between fixed station 1 and second electronic device 3 is broken, the GPS correction data that has already stored in second electronic device 3 can be received from second electronic device 3 through radio connection. Therefore, second electronic device 3 can securely receive the GPS correction data transmitted from fixed station 1.

Second Exemplary Embodiment

In the first exemplary embodiment described above, each phase counter counts a wave number of a carrier wave received from the GPS satellite based on a time indicated by the clock of each electronic device. However, since an error occurs in the time indicated by each cock, an error occasionally occurs in a count value read at each time. Therefore, the error in the count value causes an error in positioning. A second exemplary embodiment is characterized in that a time when a count value is read by second electronic device 3 is corrected based on a decimal part of path difference Δd calculated by first electronic device 2. The second exemplary embodiment will be described below with reference to FIGS. 6 and 7.

1. Configuration

Figure 6:
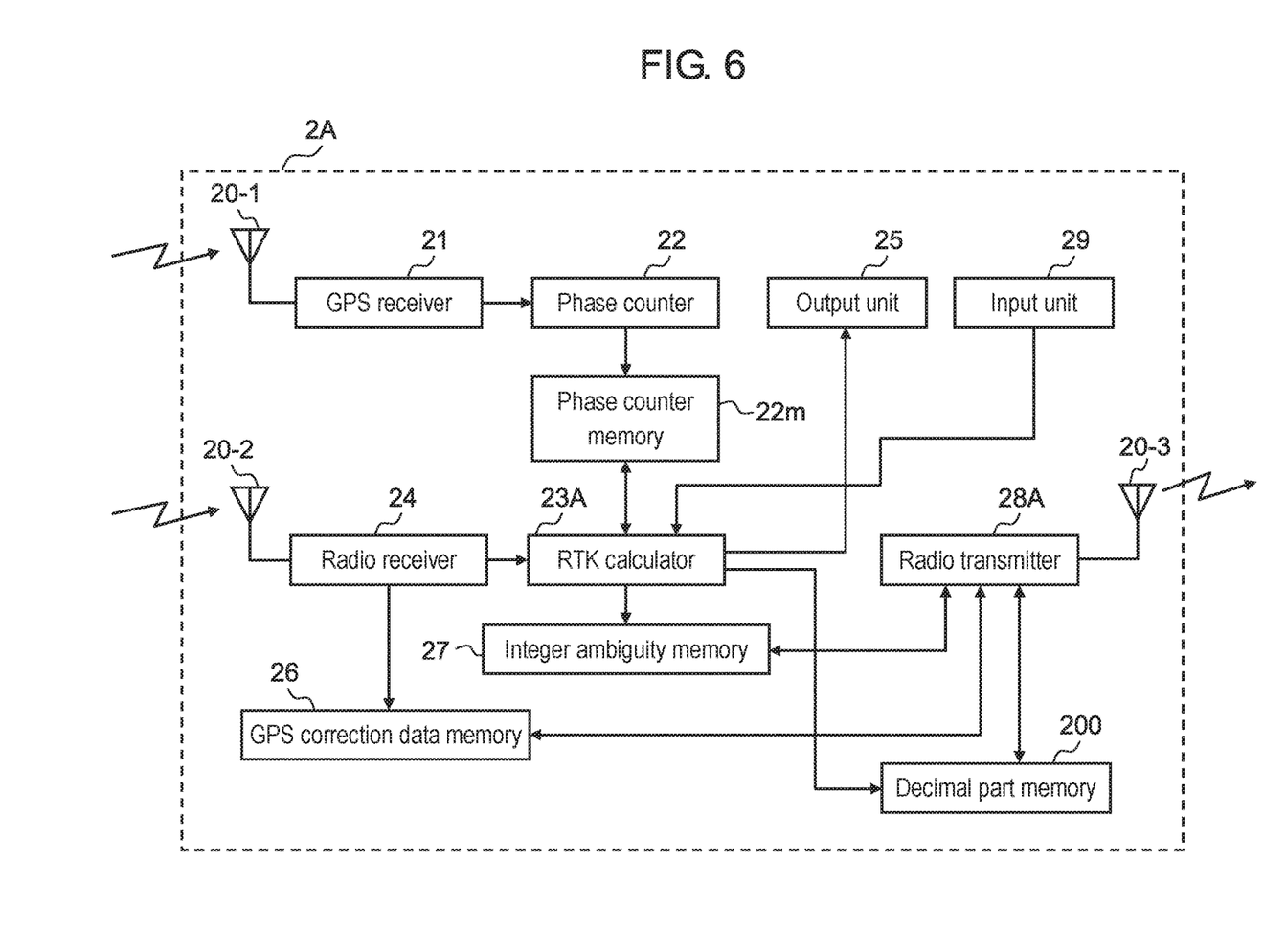
FIG. 6 is a block diagram illustrating constituent elements of a first electronic device according to a second exemplary embodiment of the present disclosure.

FIG. 6 is a block diagram illustrating constituent elements of first electronic device 2A according to the second exemplary embodiment of the present disclosure. In comparison with first electronic device 2 in FIG. 3, first electronic device 2A in FIG. 6 includes RTK calculator 23A instead of RTK calculator 23, and radio transmitter 28A instead of radio transmitter 28, and further includes decimal part memory 200 between RTK calculator 23A and radio transmitter 28A.

RTK calculator 23A according to the second exemplary embodiment is different from RTK calculator 23 according to the first exemplary embodiment in that a first decimal part in the path difference that is the difference between the first carrier phase and the second carrier phase is decided based on an input positioning start instructing signal and is stored in decimal part memory 200.

Radio transmitter 28A according to the second exemplary embodiment is different from radio transmitter 28 according to the first exemplary embodiment in that first decimal part data stored in decimal part memory 200 is transmitted to second electronic device 3 via radio transmitting antenna 20-3.

Figure 7:
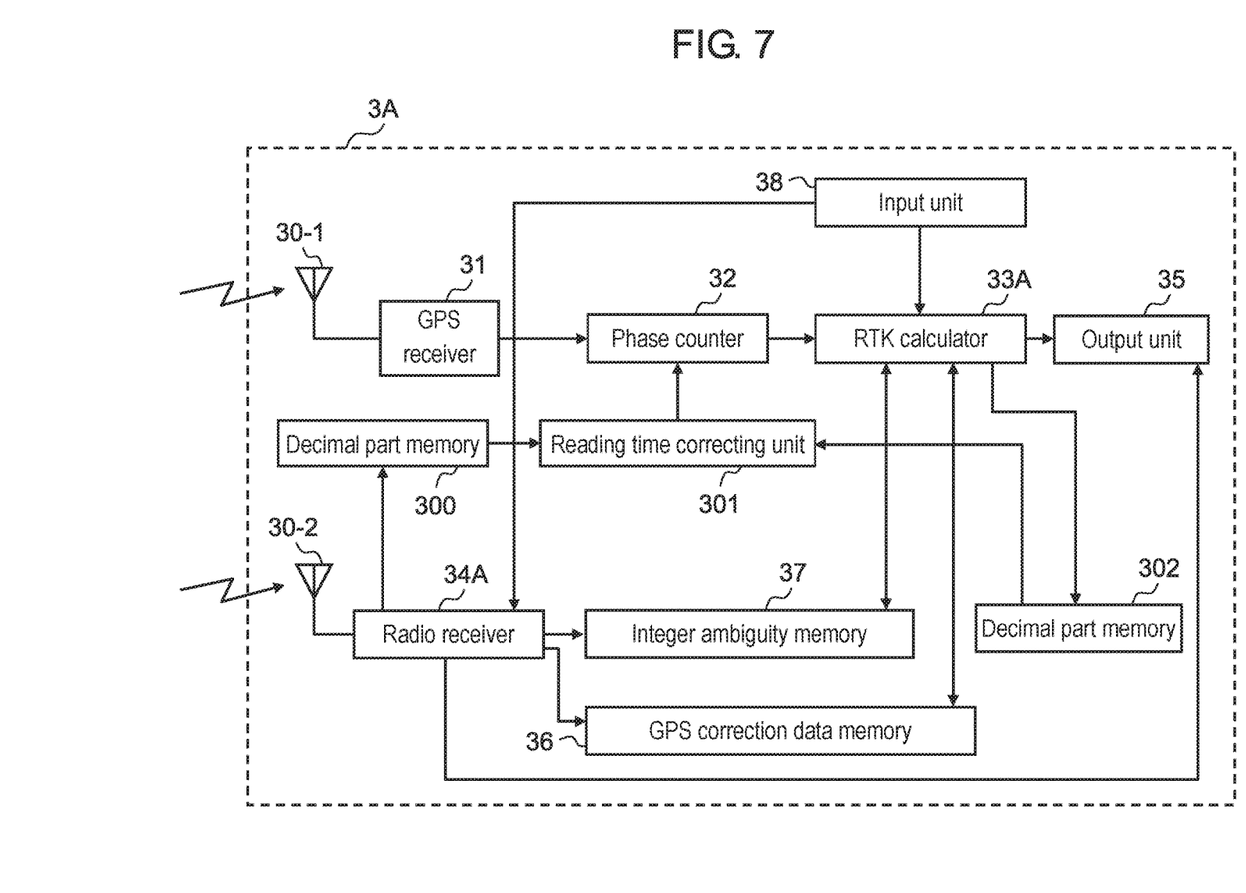
FIG. 7 is a block diagram illustrating constituent elements of a second electronic device according to the second exemplary embodiment of the present disclosure.

FIG. 7 is a block diagram illustrating constituent elements of second electronic device 3A according to the second exemplary embodiment of the present disclosure. In comparison with second electronic device 3 according to the first exemplary embodiment, second electronic device 3A according to the second exemplary embodiment includes RTK calculator 33A instead of RTK calculator 33, and radio receiver 34A instead of radio receiver 34, and further includes reading time correcting unit 301 that corrects a reading time of a count value in phase counter 32. Further, in comparison with second electronic device 3 according to the first exemplary embodiment, second electronic device 3A according to the second exemplary embodiment further includes decimal part memory 300 between reading time correcting unit 301 and radio receiver 34A, and decimal part memory 302 between RTK calculator 33A and reading time correcting unit 301.

In comparison with radio receiver 34 according to the first exemplary embodiment, radio receiver 34A according to the second exemplary embodiment receives the first decimal part data via radio receiving antenna 30-2 based on the input reception start signal, and stores the first decimal part data in decimal part memory 300.

RTK calculator 33A according to the second exemplary embodiment is different from RTK calculator 33 according to the first exemplary embodiment in that a second decimal part in the path difference that is the difference between the first carrier phase and the third carrier phase is decided based on the input positioning start instructing signal, and is stored in decimal part memory 302.

Reading time correcting unit 301 corrects a reading time of phase counter 32 based on a value of the second decimal part stored in decimal part memory 302 and a value of the first decimal part stored in decimal part memory 300. That is, a second phase counter value in first electronic device 2 is assumed to be an accurate value, and a reading time of a count value of a wave number of radio waves in second electronic device 3 is corrected such that a third phase counter value in second electronic device 3 becomes the second phase counter value. For example, the value of the first decimal part is assumed to be 0.5, and the value of the second decimal part is assumed to be 0.8. In this case, the reading time in second electronic device 3 is corrected so as to be early by time $\Delta T$. Time $\Delta T$ is $3/10 (=0.8-0.5)$ of a time corresponding to one wavelength of a carrier wave (a time required for advancing by one wavelength).

The navigation satellite system according to the second exemplary embodiment can perform an operation similar to the operation of the navigation satellite system according to the first exemplary embodiment. Further, in comparison with the first exemplary embodiment described above, the navigation satellite system according to the second exemplary embodiment can correct the reading time of the count value of second electronic device 3. Therefore, since an error in count values read at the identical time can be corrected, an error to be caused in positioning can be suppressed.

3. Effects and Others

As described above, in the navigation satellite system according to the second exemplary embodiment, RTK calculator 23A further decides the first decimal part in a difference between the first carrier phase and the second carrier phase in first electronic device 2. Further, in second electronic device 3, RTK calculator 33A further decides the second decimal part in a difference between the first carrier phase and the third carrier phase. Second electronic device 3 further includes reading time correcting unit 301 that corrects a time at which the third carrier phase is read such that a value of the second decimal part becomes a value of the first decimal part.

Since this configuration make it possible to correct a time at which a carrier phase of a radio wave in second electronic device 3 is read, a path difference that is a difference between a third carrier wave received by second electronic device 3 and a first carrier wave received by fixed station 1 can be calculated more accurately. Therefore, position coordinates of second electronic device 3 can be calculated more accurately.

Other Exemplary Embodiments

The first and second exemplary embodiments are described above as a technical example disclosed in the present application. However, the technology of the present disclosure is not limited to the first and second exemplary embodiments, but is applicable to another exemplary embodiment in which a change, a replacement, an addition, or an omission is appropriately made. A new exemplary embodiment can also be made by a combination of the constituent elements described in the first and second exemplary embodiments.

In the above exemplary embodiments, constituent elements that constitute fixed station 1 and each of first and second electronic devices 2, 3 may be configured as one module, or combinations of the constituent elements configure a plurality of modules. A GPS receiving antenna, a radio transmitting antenna, and a radio receiving antenna may be external antennas installed outside fixed station 1 and first and second electronic devices 2, 3, or built-in antennas installed inside fixed station 1 and first and second electronic devices 2, 3. In the above exemplary embodiments, the constituent elements of first electronic device 2 differ from the constituent elements of second electronic device 3 for easy understanding of the present disclosure. However, the constituent elements may be identical to each other between first electronic device 2 and second electronic device 3.

Further, in the above exemplary embodiments, fixed station 1 is installed at the electronic reference point having known position coordinates, but the present disclosure is not limited to this configuration. For example, only GPS receiving antenna 10 of fixed station 1 may be installed at the electronic reference point, and fixed station 1 may be installed on a place different from the electronic reference point. Further, in the above exemplary embodiments, GPS correction data to be used by second electronic device 3 is received from first electronic device 2, but the present disclosure is not limited to this configuration. For example, the GPS correction data to be used by second electronic device 3 may be received from fixed station 1.

Further, in the in the above exemplary embodiments, fixed station 1 is described as a fixed station (a real reference station: RRS) installed at a known point, but the fixed station is not limited to this. For example, a virtual reference station (VRS) may be used.

Further, in the above exemplary embodiments, integer ambiguity means integer ambiguity of a double phase difference or integer ambiguity of a single phase difference. However, the integer ambiguity is not limited to them. For example, this value may be a value obtained as a result of RTK calculation, or one or more results may be used.

Further, in the above exemplary embodiments, a personal computer is exemplified as the electronic devices, but the present disclosure is not limited to this configuration. For example, the present disclosure is widely applicable to electronic devices such as tablet terminals, mobile phones, and smart phones.

The exemplary embodiments have been described above and exemplified as the technique of the present disclosure. The accompanying drawings and detailed description have been provided for this purpose.

Accordingly, the constituent elements described in the appended drawings and the detailed description include, in order to exemplify the above described technology, not only constituent elements essential for solving the problem but also constituent elements that are not essential. Therefore, it should not be immediately construed that these constituent elements that are not essential are essential even if the constituent elements are described in the appended drawings and the detailed description.

Since the above described exemplary embodiments are for exemplifying the technique of the present disclosure, various modifications, replacements, additions, and omissions can be made within the scope of the appended claims or of their equivalents.

The present disclosure can be applied to electronic devices that have a function for calculating position coordinates in accordance with the RTK positioning method. Specifically, the present disclosure is applicable to tablet terminals, mobile phones, smart phones, and the like.

What is claimed is:

1. A navigation satellite system comprising:
a first electronic device and a mobile station that calculate position coordinates of the first electronic device and the mobile station by using radio waves from a global navigation satellite system (GNSS) satellite, respectively,
wherein
the first electronic device includes
a first receiver that receives GNSS correction data from a fixed station installed at a known point,
a first processor that determines, based on the received GNSS correction data, integer ambiguity in a difference between a first carrier phase of a first radio wave received by the fixed station and a second carrier phase of a second radio wave received by the first electronic device, and calculates a path difference between the first radio wave and the second radio wave to calculate first relative coordinates of the first electronic device with respect to the fixed station, and
a transmitter that transmits the integer ambiguity to the mobile station, and
the mobile station includes
a second receiver that receives the integer ambiguity from the first electronic device, and
a second processor that calculates, based on the GNSS correction data, a difference between a third carrier phase of a third radio wave received by the mobile station and the first carrier phase and calculates, by using the integer ambiguity, a path difference between the first radio wave and the third radio wave to calculate second relative coordinates of the mobile station with respect to the fixed station; and
the second processor outputs position of the mobile station.

2. The navigation satellite system according to claim 1, wherein
the transmitter of the first electronic device transmits the GNSS correction data from the fixed station to the mobile station, and
the second receiver receives the GNSS correction data from the first electronic device.

3. The navigation satellite system according to claim 1, wherein
in the first electronic device, the first processor further determines a first decimal part in the difference between the first carrier phase and the second carrier phase,
in the mobile station, the second processor further determines a second decimal part in the difference between the first carrier phase and the third carrier phase, and
the mobile station further includes a correcting unit that corrects a time at which the third carrier phase is read such that a value of the second decimal part becomes a value of the first decimal part.

4. A positioning method for a navigation satellite system including first and mobile stations that calculate position coordinates of the first and mobile stations by using a radio wave from a global navigation satellite system (GNSS) satellite, respectively,
the positioning method comprising:
causing the first electronic device to receive GNSS correction data from a fixed station installed at a known point;
causing the first electronic device to decide, based on the received GNSS correction data, integer ambiguity in a difference between a first carrier phase of a first radio wave received by the fixed station and a second carrier phase of a second radio wave received by the first electronic device and calculate a path difference between the first radio wave and the second radio wave to calculate first relative coordinates of the first electronic device with respect to the fixed station;
causing the first electronic device to transmit the integer ambiguity to the second mobile station;
causing the mobile station to receive the integer ambiguity from the first electronic device; and
causing the mobile station to calculate, based on the GNSS correction data, a difference between a third carrier phase of a third radio wave received by the mobile station and the first carrier phase and calculate, by using the integer ambiguity, a path difference between the first radio wave and the third radio wave to calculate second relative coordinates of the mobile station with respect to the fixed station.

5. The positioning method for the navigation satellite system according to claim 4, further comprising:
causing the first electronic device to transmit the GNSS correction data from the fixed station to the mobile station; and
causing the mobile station to receive the GNSS correction data.

6. The positioning method for the navigation satellite system according to claim 4, further comprising:
causing the first electronic device to decide a first decimal part in the difference between the first carrier phase and the second carrier phase;
causing the mobile station to decide a second decimal part in the difference between the first carrier phase and the third carrier phase; and
causing the mobile station to correct a time at which the third carrier phase is read such that a value of the second decimal part becomes a value of the first decimal part.

7. A first electronic device that calculates position coordinates of the first electronic device by using a radio wave from a global navigation satellite system (GNSS) satellite, the first electronic device comprising:
a receiver that receives GNSS correction data from a fixed station installed at a known point;
a first processor that determines, based on the received GNSS correction data, integer ambiguity in a difference between a first carrier phase of a first radio wave received by the fixed station and a second carrier phase of a second radio wave received by the first electronic device and calculates a path difference between the first radio wave and the second radio wave to calculate first relative coordinates of the first electronic device with respect to the fixed station; and
a transmitter that transmits the integer ambiguity to a mobile station that calculates position coordinates of the mobile station by using a radio wave from the GNSS satellite and outputs position of the mobile station,
wherein, when a distance between the mobile station and the first electronic device is reduced to within a predetermined range, the transmitter transmits the integer ambiguity of the first electronic device to the mobile station.

8. A mobile station that calculates position coordinates of the mobile station by using a radio wave from a global navigation satellite system (GNSS) satellite, the mobile station comprising:
a receiver that receives, from a first electronic device that calculates position coordinates of the first electronic device by using the radio wave from the GNSS satellite, integer ambiguity, which is decided based on GNSS correction data in the first electronic device, in a difference between a first carrier phase of a first radio wave received by a fixed station and a second carrier phase of a second radio wave received by the mobile station; and
a second processor that calculates, based on the GNSS correction data, a difference between a third carrier phase of a third radio wave received by the mobile station and the first carrier phase and calculates, by using the received integer ambiguity, a path difference between the first radio wave and the third radio wave to calculate second relative coordinates of the mobile station with respect to the fixed station and outputs position of the mobile station.

* * * * *